United States Patent
Inugai et al.

(10) Patent No.: US 7,377,462 B2
(45) Date of Patent: May 27, 2008

(54) TAPE CARTRIDGE

(75) Inventors: Yasuo Inugai, Ibaraki (JP); Kousuke Amano, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 397 days.

(21) Appl. No.: 11/254,816

(22) Filed: Oct. 21, 2005

(65) Prior Publication Data

US 2006/0086858 A1  Apr. 27, 2006

(30) Foreign Application Priority Data

Oct. 26, 2004  (JP) .............................. 2004-310583

(51) Int. Cl.
*G11B 23/107* (2006.01)
(52) U.S. Cl. ...................... 242/348; 360/132
(58) Field of Classification Search ................ 242/348, 242/348.2; 360/132
See application file for complete search history.

(56) References Cited

U.S. PATENT DOCUMENTS 6,886,765 B2  5/2005  Amano et al.

2004/0089756 A1  5/2004  Sanpei et al.

FOREIGN PATENT DOCUMENTS

| JP | 2003-187548 A | 7/2003 |
| JP | 2004-87067 A | 3/2004 |

*Primary Examiner*—John Q. Nguyen
(74) *Attorney, Agent, or Firm*—Birch, Stewart, Kolasch & Birch, LLP

(57) ABSTRACT

A single reel tape cartridge capable of achieving high-speed read/write access to tapes at high density by enhancing the molding accuracy of lower flange and eliminating inclination and waviness of flange walls is provided. A reel incorporated in a main case is composed of an upper flange, a lower flange, and a boss which is integrally plastic-molded with the lower flange for taking up a magnetic tape. An exit port for allowing an operating nail of an unlock tool to get in and out is open on the bottom wall of the boss. The lower flange is molded in the state that a bridging piece extending along radial direction of the lower flange is formed in the exit port, so that resin flow to the flange wall radially outside the exit port is promoted. The bridging piece is removed after the lower flange is molded.

9 Claims, 9 Drawing Sheets

TAPE CARTRIDGE

BACKGROUND OF THE INVENTION

The present invention relates to a single reel tape cartridge in which only one reel for winding magnetic tapes is housed inside a main case.

This type of tape cartridge has a reel lock mechanism between a reel and a main case so as to prevent the reel from idly rotating during unused time. The reel lock mechanism is available in several configurations. One configuration is such that the entire reel is pressed toward a lower case by a circular-plate-shaped reel presser so that lock teeth provided between the reel presser and a lower flange are engaged with each other to prevent idle rotation of the reel (see, e.g., JP 2003-187548 A, paragraph 0016, FIG. 3). The reel presser is supported in such a way as to allow vertical movement but not to allow rotation, and is constantly depressed downward by means of a lock spring. In this example, a gin unlock tool is disposed on the inner face of a bottom wall of a boss of the lower flange, and by operating the unlock tool so as to be pushed upward by a drive shaft of a tape drive, locked engagement between the reel presser and the lower flange is cancelled and the reel is rotatably driven.

The unlock tool is formed from a component extending three arms radially to the outer circumference from a principal surface wall in the center and having downward operating nails at the top ends of the respective arms. In order to protrude each operating nail to the lower face of the case, three exit ports are provided on the bottom wall of the boss in a vertically penetrating way. Drive teeth engaging with the drive shaft are intermittently formed on the outer face of the bottom wall of the boss, and the exit ports are provided in between the teeth.

In order to enhance the molding accuracy of flange walls, the present invention aims at optimizing a flow route of resins when lower flanges are molded. Enhancing the molding accuracy by partially changing the structure of the lower flanges are known to public as disclosed in JP 2004-87067 A (paragraph 0049, FIG. 9) for example. In this example, the structure of a position reference plane formed at three locations on the lower face of a bottom wall of a boss is changed. More specifically, the position reference plane originally having a solid structure is changed into a C-shaped frame so as to prevent "surface sink" during molding. It is to be noted that a reel lock mechanism in this example prevents idle rotation of the reel during unused time by engaging lock teeth formed on the periphery of a lower flange with a reel lock. Consequently, the exit ports for operating nails essential for the former example are not formed on the bottom wall of the boss in this example.

When the exit ports are formed on the bottom wall of the boss across the circumferential direction as described before, melted resin flows while de-touring the exit ports during molding process of the lower flange. Consequently, when the melted resin which detoured the exit ports converge, weld lines are generated, which causes uneven filling of resin and creates distortion on flange walls. More specifically, when a gate position is set in the center on the lower face of the low flange, a resin flow to a flange wall on an extension of an exit port tends to delay in proportion to the resin flow to other sections. This causes dispersion in filing density of resin on the flange wall in circumferential direction, generating waviness and inclination on the flange wall after solidification. The run-out amount on the flange face caused by the waviness and the inclination amounts to maximum 0.292 mm, which has been a major hurdle of achieving high-density and high-speed read/write access to magnetic tapes.

SUMMARY OF THE INVENTION

An object of the present invention is to provide a single reel tape cartridge capable of achieving high-speed read/write access to magnetic tapes at high density by optimizing a flow pattern of resin during molding of lower flanges so as to enhance the molding accuracy of flange walls for ensuring an appropriate winding posture of magnetic tapes wound onto the reel and solving problems such as damages on tape edges.

A tape cartridge in the present invention has a single reel 2 disposed inside a main case 1 for taking up a magnetic tape 3 as shown in FIG. 2. The reel 2 is a plastic molding formed by integrally molding a lower flange 11 and a boss 12 for taking up the magnetic tape 3. A reel lock mechanism is formed between a bottom wall of the boss 12 and an upper case 1a of the main case 1 for keeping the reel 2 in a locked state so as not to rotate when not in use. As shown in FIG. 3, an unlock tool 25 is disposed on an inner face of the bottom wall of the boss 12 for unlock operation of the reel lock mechanism. An exit port 18 is formed on the bottom wall of the boss in a region close to an outer circumference so as to connect inside and outside. The unlock tool 25 has an operating nail 28 facing a lower face of the case from the exit port 18.

The unlock tool 25 may be a component extending three arms 27 at regular intervals in circumferential direction to the outer circumference from a principal surface wall 26 in the center and having operating nails 28 formed downward in extended ends of respective arms 27 in order to secure stability offered by three-point support as shown in FIG. 2. In this case, three exit ports 18 corresponding to the respective operating nails 28 are formed on the boss 12. If the circumferential length of respective exit ports 18 is sufficiently secured, the operating nails 28 may be moved in and out with their circumferential length being made large enough to allow for mechanical strength of the operating nails 28 themselves. However, the larger the circumferential length of the respective exit ports 18 becomes, the more the flowability of the resin during molding of the lower flange 11 is disturbed. This should be taken into consideration in the present invention.

According to the present invention, in the single reel tape cartridge, as shown in FIG. 1, the boss 12 is molded integrally with a bridging piece 31 which seals at least a part of the exit port 18, and during molding of the lower flange 11 and the boss 12, a melted molding resin is made to flow between the boss 12 and the lower flange 11 through the bridging piece 31 in radial direction at a region where the exit port is present.

More specifically, as shown in FIG. 1, a gate position G for resin injection during molding of the lower flange 11 and the boss 12 is set in the center of a lower face of the bottom wall of the boss 12. According to this structure, a melted resin injected into the gate position G during molding of the lower flange 11 flows from the side of the boss 12 to the side of the lower flange 11 through the bridging piece 31 in the exit port 18.

The bridging piece 31 is removed after the lower flange 11 is molded so that the exit ports 18 can be fully opened. In this case, in order to facilitate removal of the bridging piece 31, the bridging piece 31 may be linked to the inner circumferential face of an opening of the exit ports 18 through a thinned critical sectional portion 32.

A plurality of bridging pieces 31 may be dispersed in circumferential direction in one exit ports 18 as shown in a second embodiment in FIG. 7 and FIG. 8. It is preferable, however, to dispose one bridging piece 31 in the circumferential center of one exit ports 18. In this case, the bridging piece 31 may be formed on a phantom line P connecting the gate position G and the circumferential central portion of the exit port 18.

Moreover, in the present invention, as shown in FIG. 11 and FIG. 12, one bridging piece 31 may be integrally formed in a circumferential central region of one exit port 18 in such a way that both radial ends of the bridge piece are connected to an inner circumferential face of the exit port 18 so as to remain. The term "remain" herein indicates that the bridging piece 31 is not removed but used. In the operating nail 28 in this case, an undercut for avoiding contact interference with the bridging piece 31 may be formed so that the operating nail 28 can get in and out of gaps 36 formed on both circumferential sides of the exit port 18 which interpose the bridging piece 31.

In the present invention, during molding of the lower flange 11, melted molding resin flows in radial direction through the bridging piece 31 in a region where the exit port 18 is present. In this case, with a gate position G for resin injection being set in the center of the lower face of the bottom wall of the boss 12, the melted resin injected into the gate position G flows from a molded space of the boss 12 to a molded space of the lower flange 11. Therefore, in the lower flange 11, the filing density on the flange wall in circumferential direction becomes uniform, which enhances the molding accuracy. As a result, waviness and inclination on the lower flange wall 11 of the reel 2 after molding are eliminated, so that considerable reduction in run-out amount on the flange face is achieved, the winding posture of the tape 3 wound onto the reel 2 becomes more appropriate than that in the case of conventional reels, and damages on tape edges and the like are cleared away, thereby making it possible to achieve high-speed read/write access of signals to the tape 3 at high density. Since the flow pattern of the resin can be optimized without drastic change in mold, there is also an advantage that the lower flange 11 with the boss 12 can be integrally molded at low costs with use of existing injection molds.

With the bridging piece 31 being removed after molding of the lower flange 11, the exit port 18 is made to be fully open as desired as in the case with forming the exit port 18 to have enough circumferential length by casting with use of a mold. Therefore, since it is not necessary to change the shape and the structure of the operating nail 28 of the unlock tool 25 which can get in and out of exit port 18, an existing unlock tool 25 may be applied without modification, which allows the costs necessary for manufacturing tape cartridges to be reduced proportionally. More particularly, it becomes possible to form the operating nail 28 to be long and wide in circumferential direction for securing the strength.

With both the radial ends of the bridging piece 31 being linked to the inner circumferential face of the exit ports 18 through the critical sectional portion 32, the bridging piece 31 can easily be removed with use of the critical sectional portion 32. Therefore, the bridging piece 31 can be removed without troubles.

When the gate position G is set in the center of the lower face of the bottom wall of the boss 12, and one bridging piece 31 is formed on a phantom line P connecting the gate position G and the circumferential central portion of the exit port 18, melted resin injected from the gate G position flows by the most direct way to a flange wall portion radially outside the exit port 18 through the molded space of the bridging piece 31, which makes the filing density of the flange wall in circumferential direction more uniform and makes it possible to secure high molding accuracy of the flange wall.

Leaving the bridging piece 31 in the exit port 18, forming the undercut 35 on the operating nail 28 for avoiding contact interference with the bridging piece 31, and allowing the operating nail 28 to get in and out of the exit port 18 through the gap 36 between the bridging piece 31 and the inner circumferential face of the exit port 18 bring about an advantage that the exit port 18 can be reinforced by the bridging piece 31 while labor of removing the bridging piece 31 is saved to reduce the processing costs of the lower flange 11.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE
PREFERRED EMBODIMENTS

First Embodiment

Figure 1:
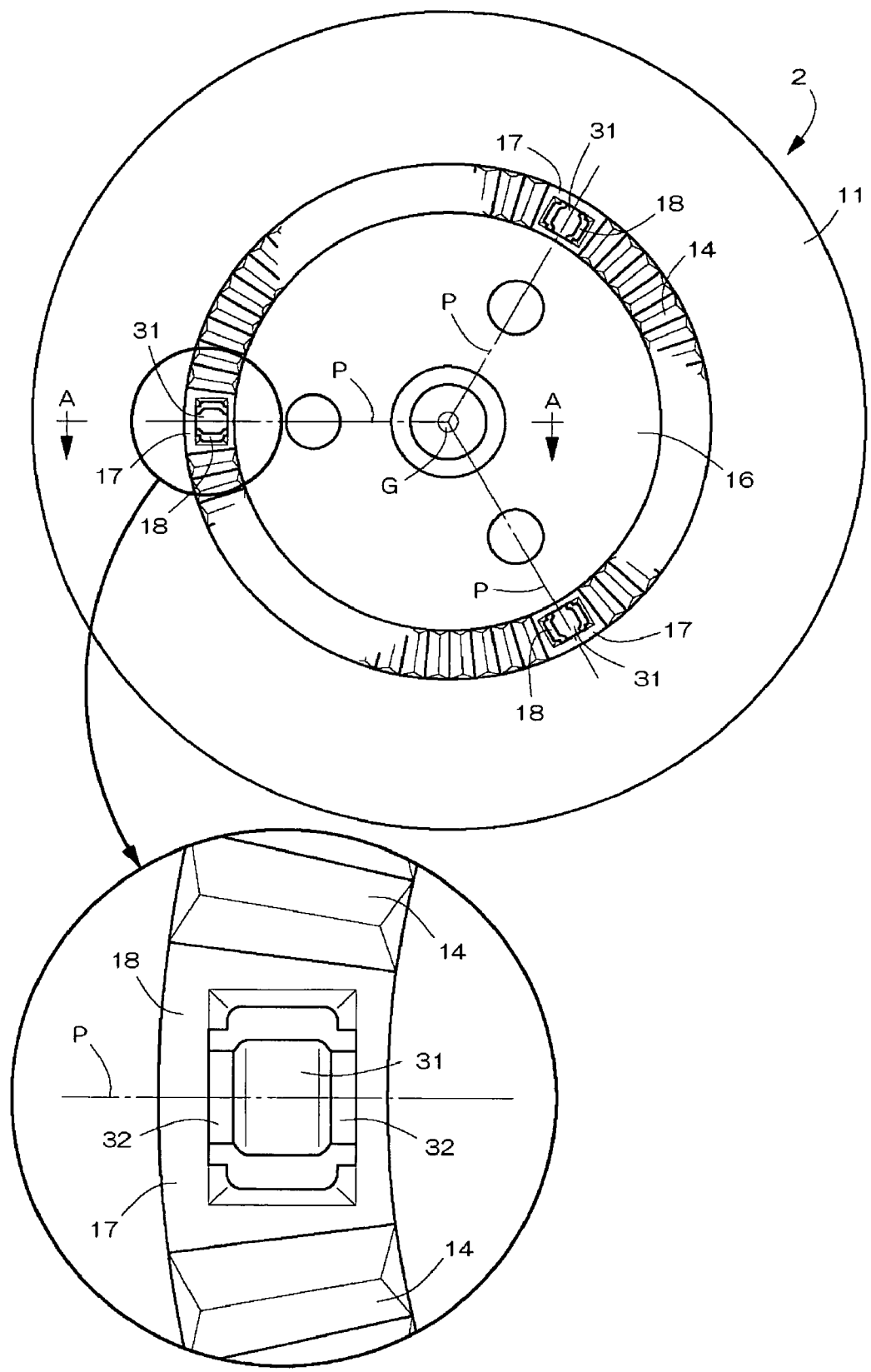
FIG. 1 is a bottom view showing a lower flange.
Figure 2:
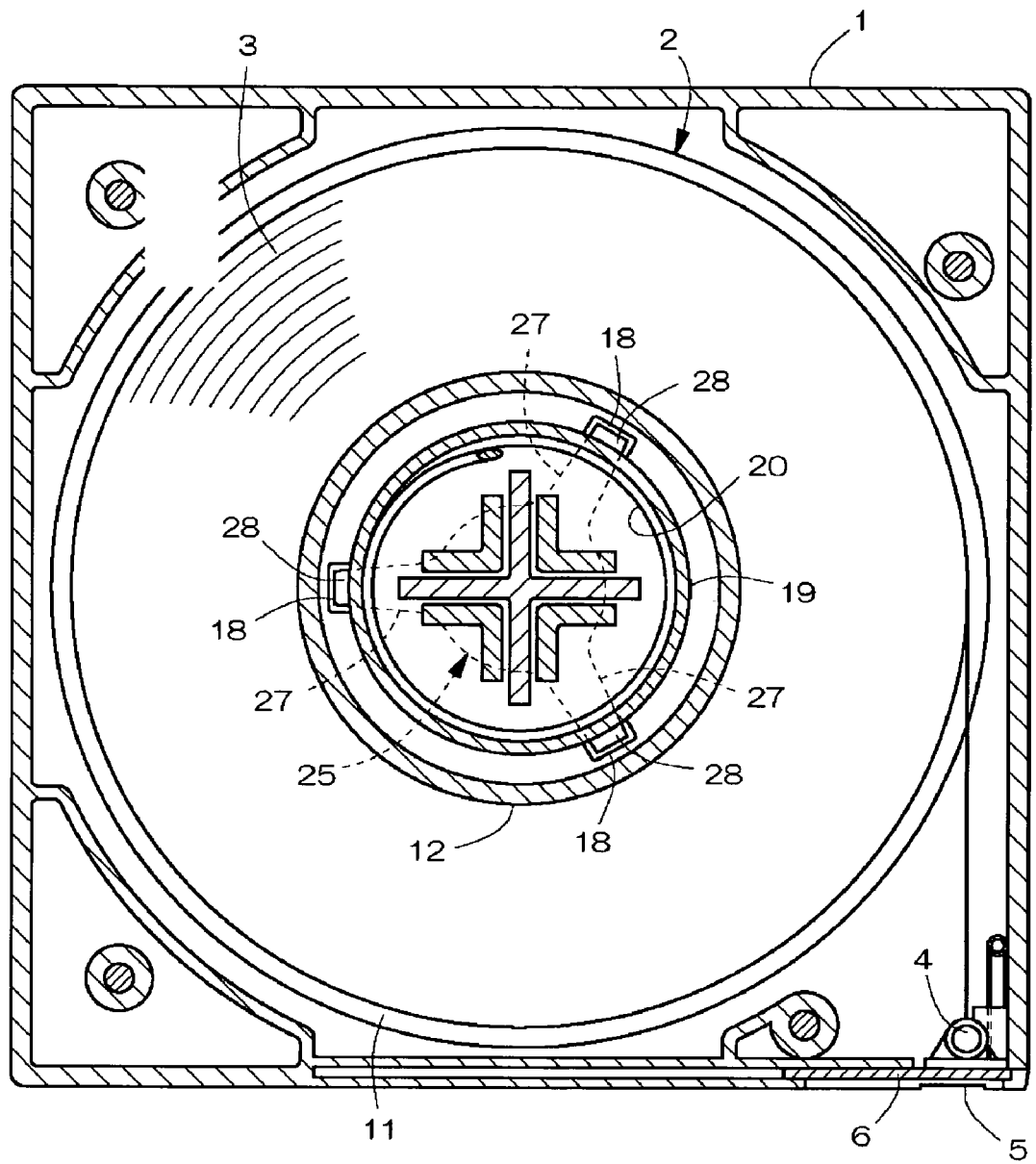
FIG. 2 is an inside plane view showing a single reel tape cartridge.

FIGS. 1-6 show a single reel tape cartridge of a first embodiment in the present invention. In FIG. 2, the tape cartridge has a box-type main case 1 and a single reel 2 housed therein, and a magnetic tape (hereinbelow simply referred to as a tape) 3 for recording magnetic signals is wound onto the reel 2.

A loading pin 4 used for pulling the tape 3 out of the case 1 is connected to a leading end of the tape 3. In the state that the loading pin 4 faces a tape pullout port 5 on the front right corner of the main case 1, the upper and lower ends of the loading pin 4 are held by and fixed onto a holder formed on the main case 1. The tape pullout port 5 can be opened and closed with a slidable lid 6. The lid 6 is movably biased so as to be freely closed by an unshown spring. The main case 1 is structured such that an upper case 1a and a lower case 1b respectively made of plastic are combined in a lid coupling state. A drive port 7 for driving the reel 2 is provided on the bottom wall of the lower case 1b.

The reel 2 is a plastic molding including an upper flange 10, a lower flange 11, and a boss 12 integrally formed with the lower flange 11. The boss 12 is formed into a cylindrical shape having a bottom face and an opened upper face, and a starting end of the upper flange 10 is welded afterward to the upper opening circumference of a cylindrical circumferential wall of the boss 12. The tape 3 is wound around the outer circumferential face of the cylindrical circumferential wall of the boss 12.

Figure 3:
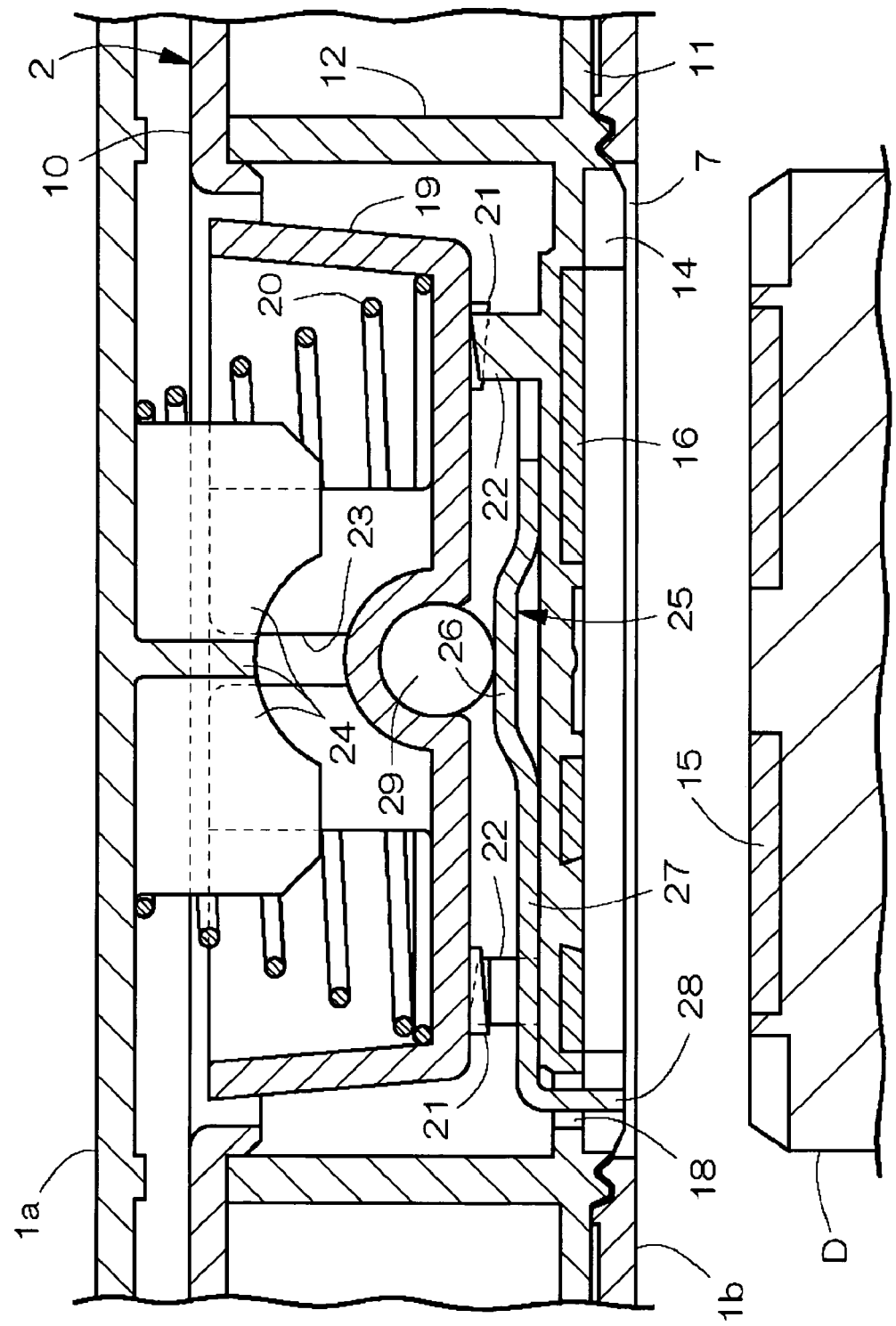
FIG. 3 is a longitudinal sectional view showing a reel lock structure.

In FIG. 1 and FIG. 3, on the lower face of a round bottom wall of the boss 12, drive teeth 14 engaging with a drive shaft D of a tape drive is integrally formed like a ring in an outer circumferential region around the center, and a adsorption plate 16 to be adsorbed by a magnet 15 in the drive shaft D is inserted inside the drive teeth 14 and secured therein.

The drive teeth 14 are gear teeth with a saw-teeth cross-section along the radial direction formed at regular intervals in circumferential direction, and has toothless portions 17 without the drive teeth 14 at three locations in the circumferential direction.

A reel lock mechanism is provided between the bottom wall of the boss 12 and the upper case 1a for keeping the reel 2 not in use in locked state so as not to rotate. In FIG. 3, the reel lock mechanism is composed of a reel presser 19, a helical compression spring 20 for depressing downward the reel presser 19, annular lock teeth 21 formed on the lower face of the bottom wall of the reel presser 19, and annular lock teeth 22 formed on the upper face of the bottom wall of the boss 12 for engaging with the lock teeth 21.

The reel presser 19 is formed in a circular plate shape with an opened upper face, and has four L-shaped ribs protruding upward in the center of the inner face. A cross-shaped guide protrusion 24 formed on the inner face of the upper case 1a is guided into a cross-shaped slide groove 23 enclosed by these ribs, by which the reel presser 19 is supported slidably in vertical direction but not rotatably around a vertical center of axle. A semicircle socket is formed in the center of the lower face of the reel presser 19, and a ball (steel ball) 29 for minimizing friction resistance with the unlock tool 25 is embedded in the socket so as to be rotated freely in the state of being exposed to the lower side.

When the tape cartridge is not used, the lock teeth 21, 22 engage with each other as shown in FIG. 3 to prevent the reel 2 from rotating. When the tape cartridge is loaded into the tape drive and the reel presser 19 is operated to press up against the spring 20, the engagement between both the lock teeth 21, 22 is cancelled to put the reel 2 in a free rotation state.

In order to perform unlocking operation of the reel presser 19 on the tape drive side, an unlock tool 25 is disposed between the reel presser 19 and the bottom wall of the boss 12. Three circumferential locations in the lock teeth 22 formed on the upper face of the bottom wall of the boss 12 are notched so as to dispose arms 27 of the unlock tool 25.

The unlock tool 25 is made of a stainless press metal fitting extending three arms 27 at regular intervals in circumferential direction to an outer circumference from a principal surface wall in the center and having operating nails 28 formed in the state of being folded downward in extended ends of the respective arms 27. If necessary, a part or the entire unlock tool 25 may be formed from plastic molding materials.

Figure 4:
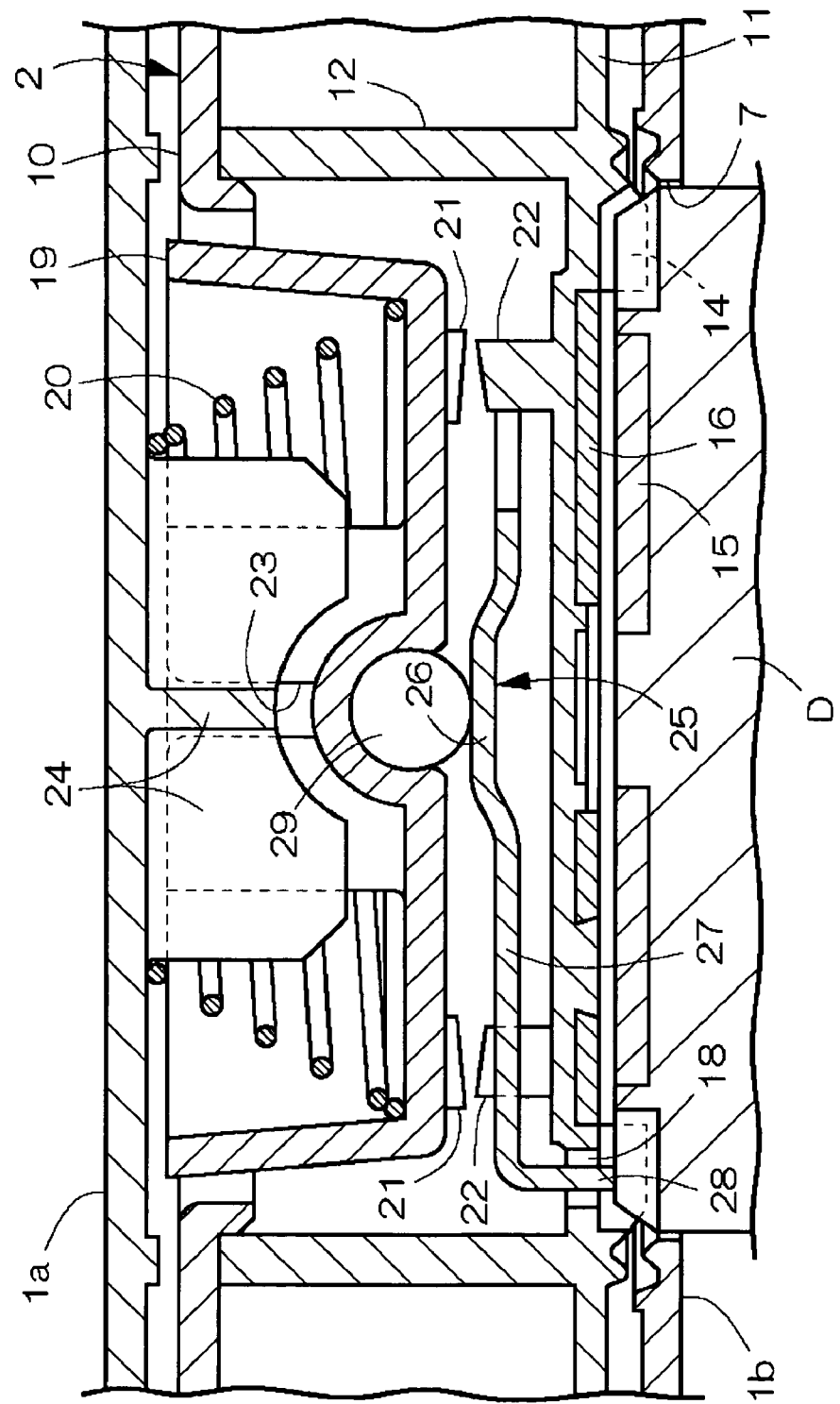
FIG. 4 is a longitudinal sectional view showing the reel lock structure in process of unlocking operation.

As shown in FIG. 3, a principal surface wall 26 of the unlock tool 25 receives the reel presser 19 through the ball 23. Consequently, when the reel lock mechanism is in a locked state, the principal surface wall 26 and the arms 27 are pressed toward the bottom wall of the boss 12, and the respective operating nails 28 protrude downward from the exit ports 18. As shown in FIG. 4, operating the operating nails 28 to be pushed up by the drive shaft D allows unlocking operation of the reel lock mechanism.

The aim of the present invention is to have an appropriate flow pattern of resin during molding of the lower flange 11 so as to enhance the molding accuracy of the flange wall portion of the lower flange 11 in the thus-structured tape cartridge. More particularly, the lower flange 11 is injection-molded by injecting melted resin from the gate position G (see FIG. 5) set in the center of the lower face of the bottom wall of the boss 12. In this case, the molding is performed with a bridging piece 31 being formed on the exit port 18, which promotes resin flowability to the flange wall portion radially outside the exit port 18, and uniforms the filing density of the flange wall in circumferential direction.

In order to straighten the flow line of the melted resin and to shorten its flow route length, one bridging piece 31 was disposed in a central circumferential portion in every exit port 18, and both radial ends of the bridging piece 31 were integrally connected to the inner circumferential wall of an opening of the exit port 18. More particularly, the bridging piece 31 was formed on a phantom line P connecting the center of the gate position G, i.e., the center of the lower face of the bottom wall of the boss 12, and the circumferential center of the exit port 18 as shown in FIG. 1.

Figure 5:
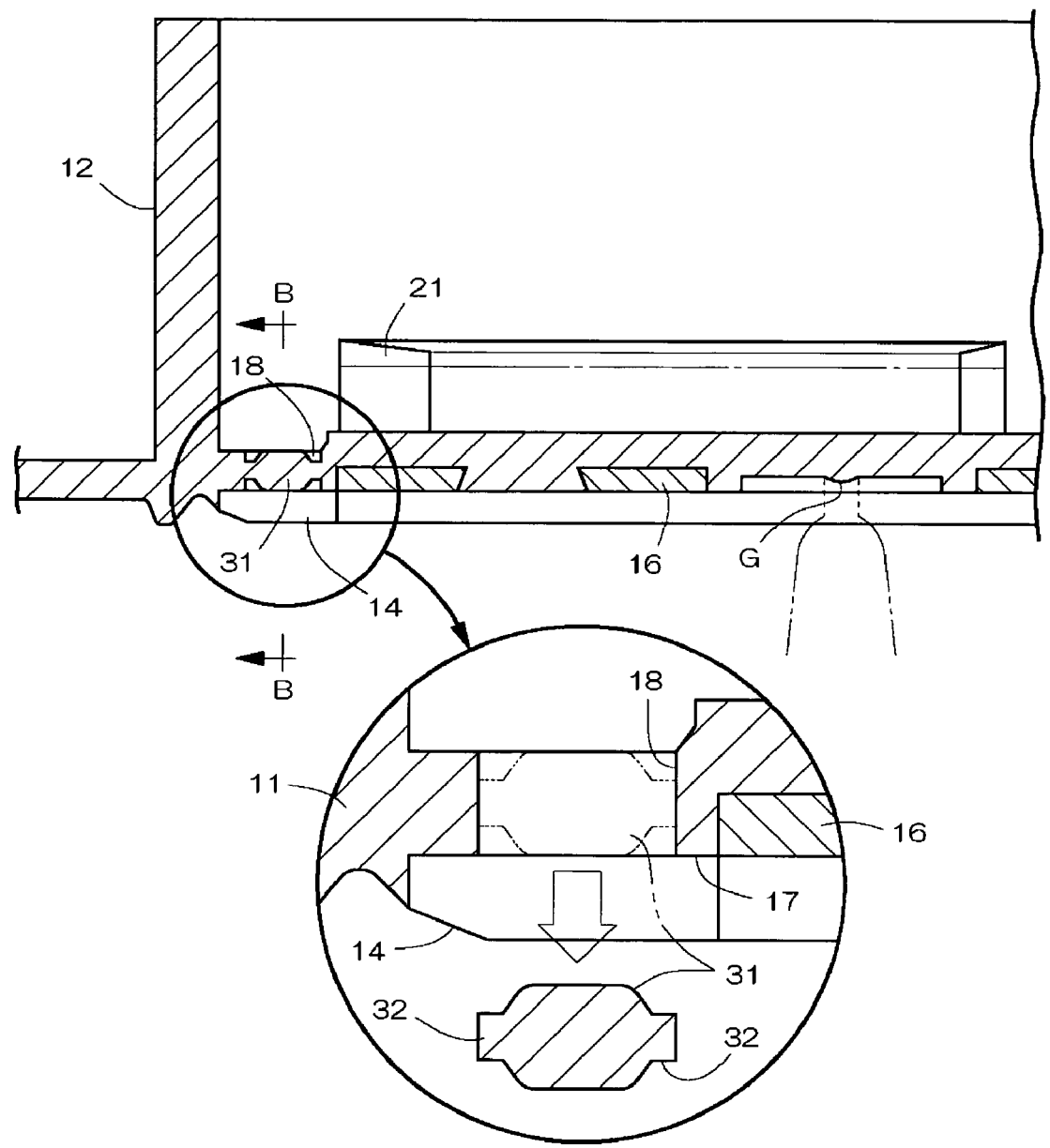
FIG. 5 is a cross sectional view taken along line A-A in FIG. 1.
Figure 6:
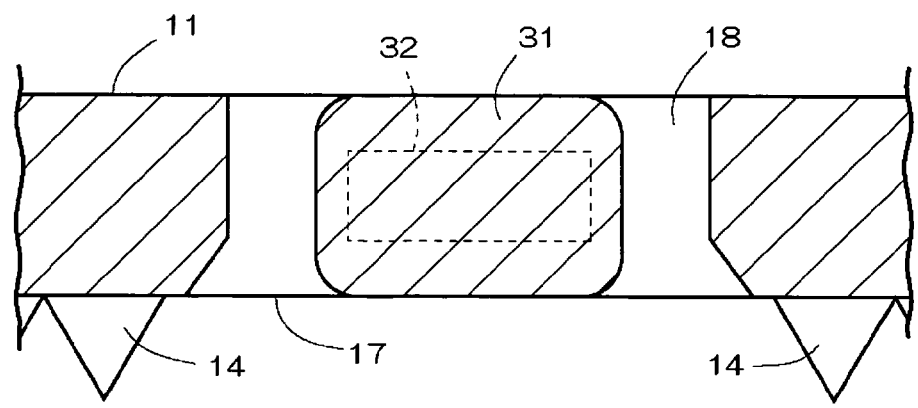
FIG. 6 is a cross sectional view taken along line B-B in FIG. 5.

In FIG. 5 and FIG. 6, the vertical thickness size of the bridging piece 31 was set to be almost identical to the thickness of the bottom wall of the boss 12. The circumferential length of the bridging piece 31 was naturally set to be smaller than that of the exit port 18.

More specifically, both the radial ends of the bridging piece 31 were linked to the inner circumferential face of the exit port 18 through a critical sectional portion 32 thinner than the bridging piece 31. The bridging piece 31 including the critical sectional portion 32 is cut away by utilizing the critical sectional portion 32 after the lower flange 11 is molded, so that the exit port 18 can be formed to have a desired opening area.

Thus, according to the lower flange 11 molded with the presence of the bridging piece 31, it became possible to uniform the filling density of the resin in the flange wall portion radially outside the exit port 18 and in other flange wall portions and to solve the problem of waviness and inclination generated on the flange wall after solidification. The run-out amount on the flange face could be reduced to 0.082 mm, which was 72% reduction from the run-out amount of the conventional lower flange. Thus, it became possible to provide a tape cartridge allowing high-density read/write access to the tape 3 at high speed.

Second Embodiment

Figure 7:
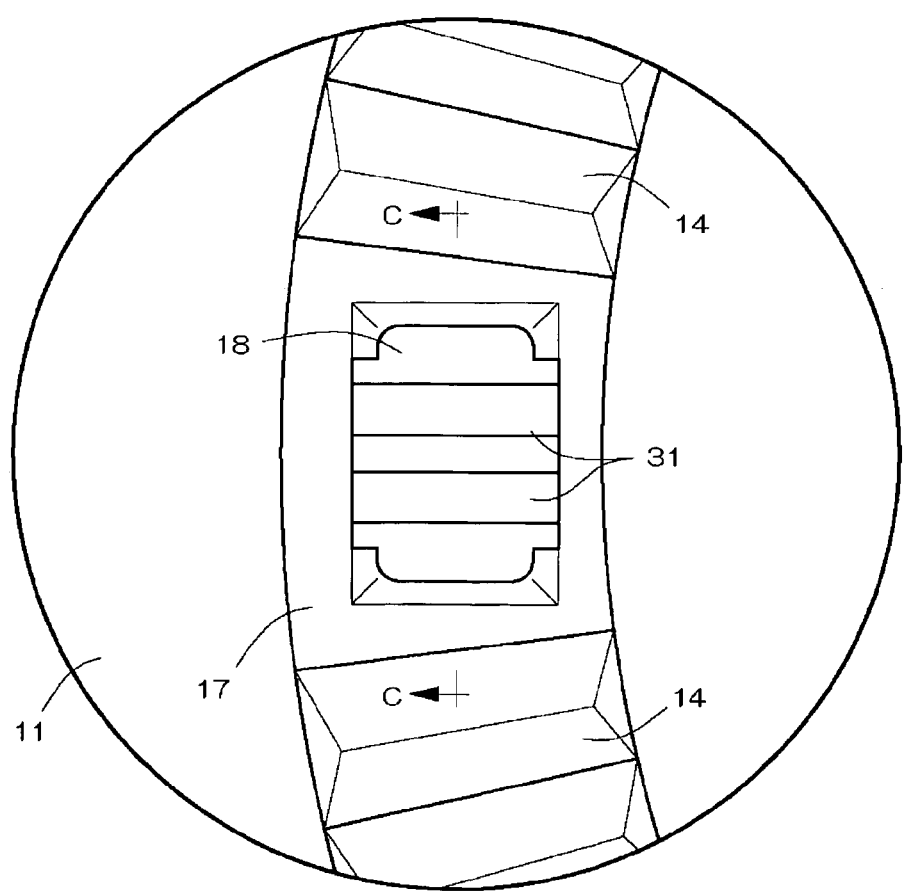
FIG. 7 is a bottom view showing a bridging piece in a second embodiment.
Figure 8:
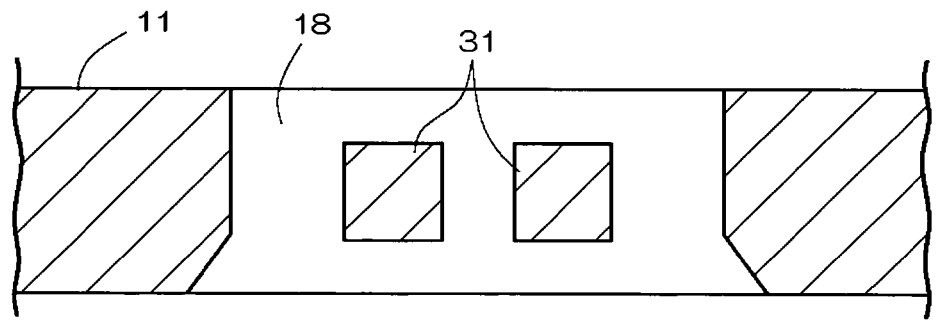
FIG. 8 is a cross sectional view taken along line C-C in FIG. 7.

FIG. 7 and FIG. 8 show a bridging piece 31 in a second embodiment in the present invention. In this case, in the single reel tape cartridge in the first embodiment, two bridging pieces 31 are disposed in every exit port 18 in a separated state in circumferential direction, so that during molding of the lower flange 11, the flowability of melted resin in the exit port 18 can be promoted. In FIG. 7, each bridging piece 31 was formed into a cross-sectional square shape, and was disposed across the exit port 18 in radial direction so that the bridging piece 31 was positioned in a central portion in vertical thickness direction of the bottom wall of the boss 12 as shown in FIG. 8. In this case, the critical sectional portion 32 was omitted as it was not necessary. Since other structures are identical to those in the first embodiment, like component members are designated by like reference numerals and description thereof is omitted. This applies to following embodiments.

Third Embodiment

Figure 9:
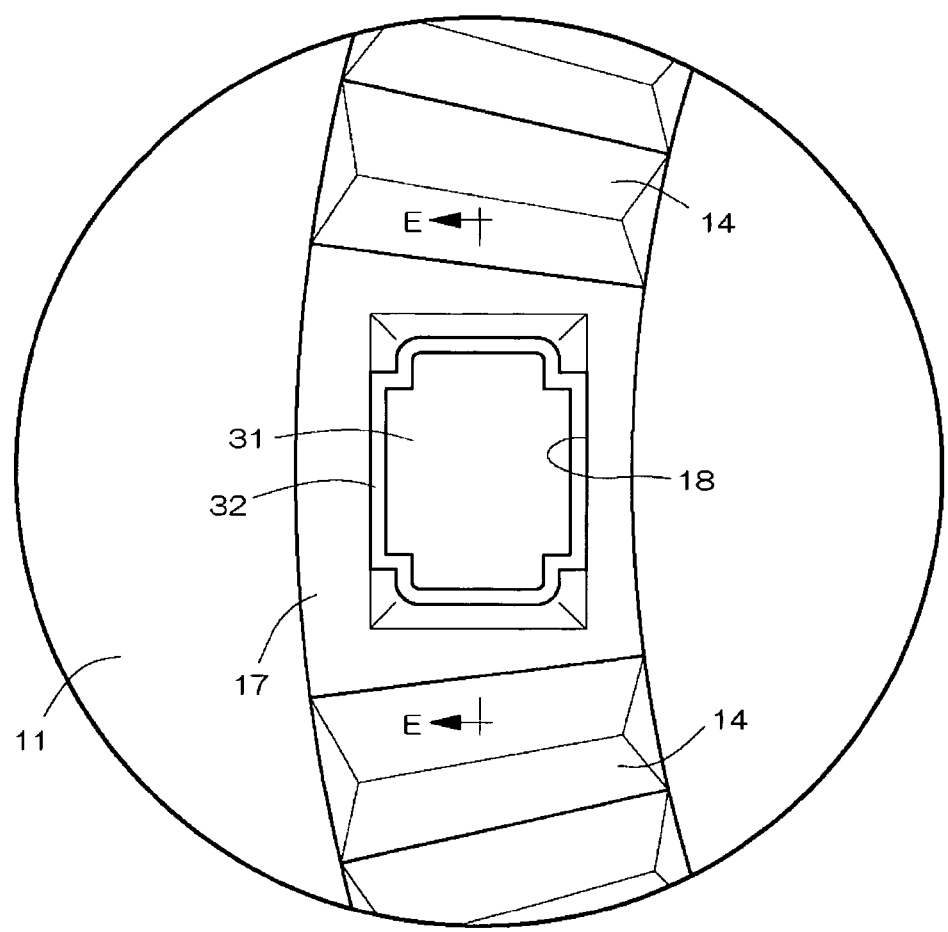
FIG. 9 is a bottom view showing a bridging piece in a third embodiment.
Figure 10:
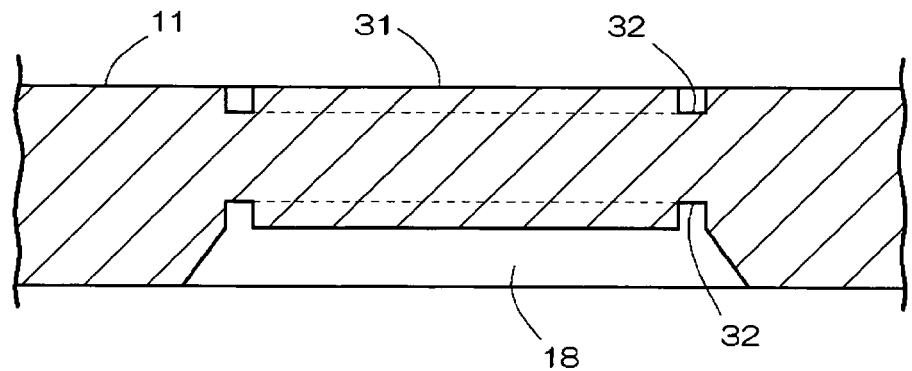
FIG. 10 is a cross sectional view taken along line E-E in FIG. 9.

FIG. 9 and FIG. 10 show a bridging piece 31 in a third embodiment in the present invention. The bridging piece 31 was made to seal the entire exit port 18 so as to promote the flowability of melted resin during molding of the lower flange 11. The critical sectional portion 32 was formed along and around the inner circumferential face of the exit port 18 on both upper and lower faces of the bridging piece 31. The vertical thickness size of the bridging piece 31 in the third embodiment was set to be slightly smaller than the thickness of the bottom wall of the boss 12 as shown in FIG. 10. This is to facilitate cutting removal of the bridging piece 31.

Fourth Embodiment

Figure 11:
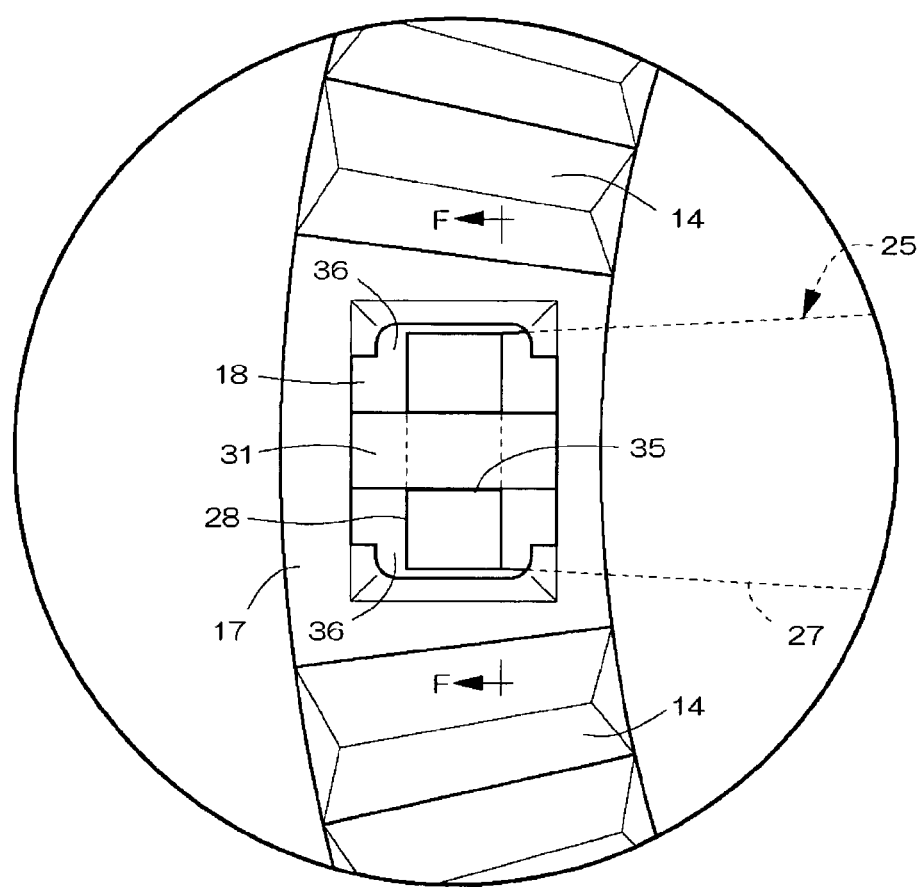
FIG. 11 is a bottom view showing a bridging piece in a fourth embodiment.
Figure 12:
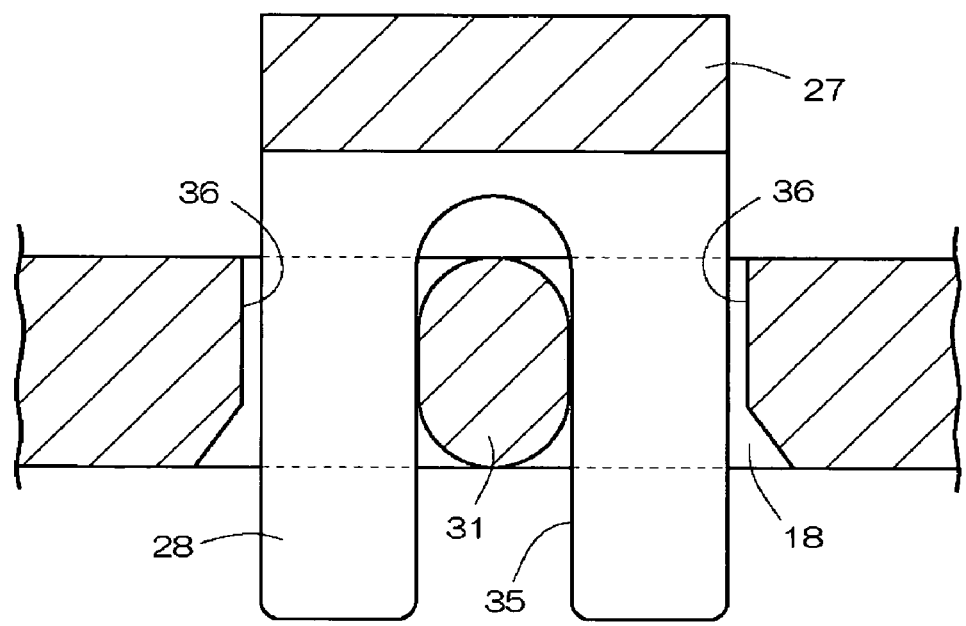
FIG. 12 is a cross sectional view taken along line F-F in FIG. 11.

FIG. 11 and FIG. 12 show a bridging piece 31 in a fourth embodiment in the present invention. This embodiment is different from the previous embodiments in the point that each exit port 18 is formed into an almost square shape long in circumferential direction, a bridging piece 31 with an oval cross section is integrally formed in the circumferential center of each exit port 18 in such a way that radial both ends of the bridging piece 31 are linked to the inner circumferential face of the opening of the exit port 18, and the lower flange 11 is used without removing the bridging piece 31. Accordingly, the operating nail 28 of the unlock tool 25 is formed in a yoked state having an undercut 35 for avoiding contact interference with the bridging piece 31, and the operating nail 28 is made to be able to get in and out of the exit port 18 through two gaps 36 generated between the bridging piece 31 and the circumferential opening face of the exit port 18.

Although in those embodiments, the bridging piece 31 was formed in the inner space of the exit port 18, the bridging piece 31 may be formed, if necessary, to have a part protruding from the exit port 18, and further the bridging piece 31 may be formed over the inner face or the outer face of the opening of the exit port 18. The gate position G may be set in a plurality of locations closer to the radial center than the exit port 18.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A single reel tape cartridge, comprising:
a single reel disposed inside a main case for taking up a magnetic tape;
the reel being a plastic molding formed by integrally molding a lower flange and a boss for taking up the magnetic tape;
a reel lock mechanism formed between a bottom wall of the boss and an upper case of the main case for keeping the reel not in use in a locked state so as not to rotate;
an unlock tool disposed on an inner face of the bottom wall of the boss for unlock operation of the reel lock mechanism;
an exit port formed on the bottom wall of the boss in an outer circumferential region so as to connect inside and outside; and
an operating nail included in the unlock tool and facing a lower face of the case from the exit port, wherein
the boss is molded integrally with a bridging piece which seals at least a part of the exit port, and
during molding of the lower flange and the boss, a melted molding resin is made to flow in radial direction between the boss and the lower flange through the bridging piece at a region where the exit port is present.

2. The single reel tape cartridge as defined in claim 1, wherein the unlock tool is a component extending three arms at regular intervals in circumferential direction to an outer circumference from a principal surface wall in a center and having operating nails formed downward in extended ends of respective arms, and
the boss has three exit ports corresponding to the operating nails.

3. The single reel tape cartridge as defined in claim 1, wherein a gate position for resin injection during molding of the lower flange and the boss is set in a center of a lower face of the bottom wall of the boss.

4. The single reel tape cartridge as defined in claim 3, wherein the bridging piece is removed after the lower flange is molded.

5. The single reel tape cartridge as defined in claim 4, wherein the bridging piece is linked to an inner circumferential face of an opening of the exit port through a thinned critical sectional portion in order to facilitate removal of the bridging piece.

6. The single reel tape cartridge as defined in claim 4, wherein one bridging piece is formed in one exit port on a phantom line connecting the gate position and a circumferential central portion of the exit port.

7. The single reel tape cartridge as defined in claim 1, wherein
the bridging piece is integrally formed in a circumferential central region of the exit port in such a way that both radial ends of the bridge piece are connected to an inner circumferential face of the exit port so as to remain,
the operating nail has an undercut for avoiding contact interference with the bridging piece, and
the operating nail can get in and out of gaps formed on both circumferential sides of the bridging piece in the exit port.

8. The single reel tape cartridge as defined in claim 7, wherein a gate position for resin injection during molding of the lower flange and the boss is set in a center of a lower face of the bottom wall of the boss.

9. The single reel tape cartridge as defined in claim 8, wherein the bridging piece is formed on a phantom line connecting the gate position and a circumferential central portion of the exit port.

* * * * *